Aug. 17, 1943.   F. J. LINGEL   2,327,114
ELECTRICAL MEASURING INSTRUMENT
Filed Aug. 11, 1941
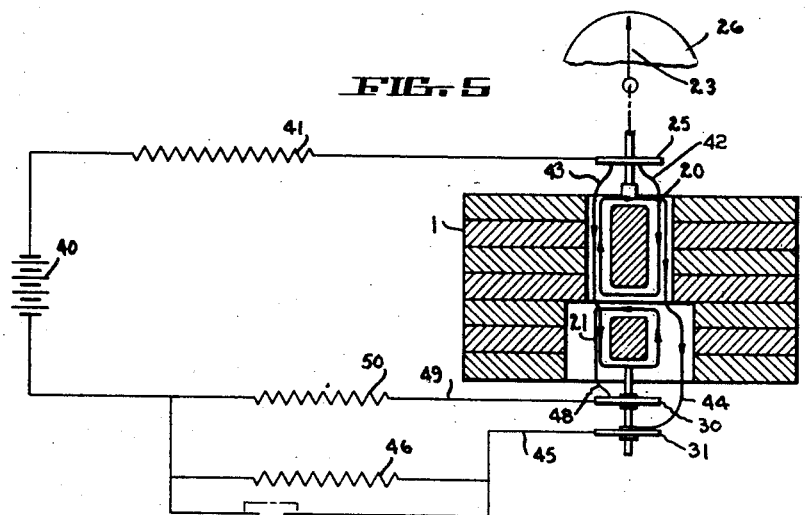
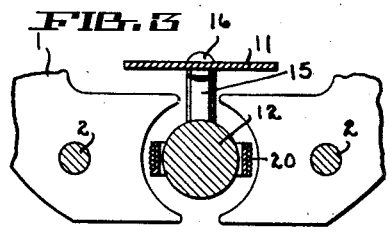
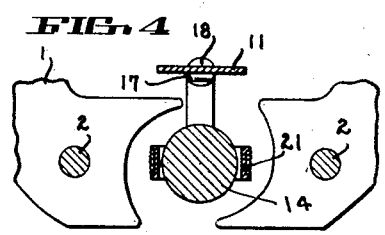
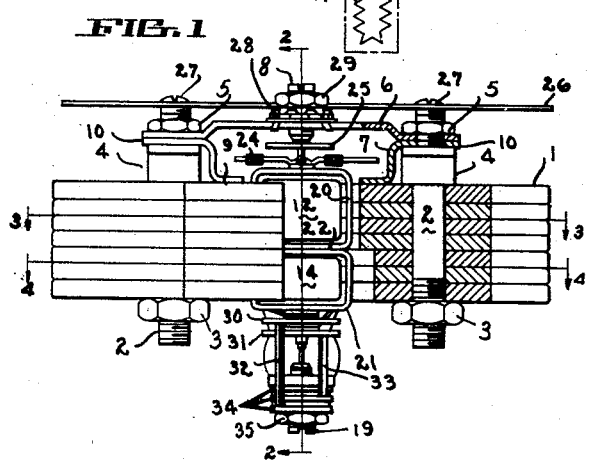
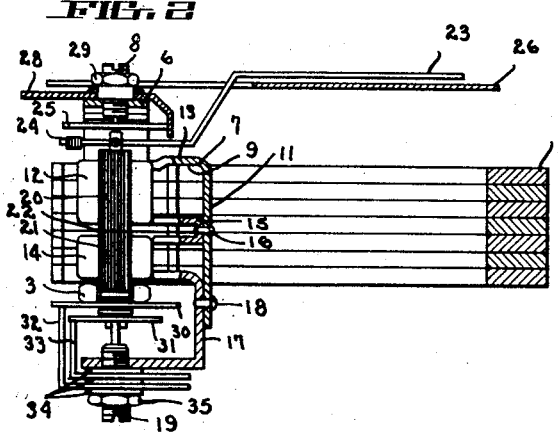
INVENTOR
FREDERICK J. LINGEL
By Taulmin & Taulmin
ATTORNEYS Patented Aug. 17, 1943

2,327,114

UNITED STATES PATENT OFFICE 2,327,114

ELECTRICAL MEASURING INSTRUMENT

Frederick Joseph Lingel, Bluffton, Ohio, assignor to The Triplett Electrical Instrument Co., Bluffton, Ohio, a corporation of Ohio Application August 11, 1941, Serial No. 406,336

2 Claims. (Cl. 171—95)

The present invention relates to electrical measuring devices and particularly to meters such as an ohm meter for determining the ratio between two currents or two voltages, etc.

The primary object of the present invention is to provide an improved measuring device for determining the ratio between two currents.

Another object is to provide an ohm meter in which the variations of the actuating electromotive force are utilized at the meter and do not affect the indications of the instrument.

Still another object is to provide a current ratio meter employing two coils, through which the respective currents are caused to flow, and subjecting one of the coils to a magnetic field of constant value and the other of the coils to a magnetic field of progressively increasing value as the current through that coil is increased.

The general object of the invention is to provide an improved meter for giving an accurate direct reading of two or more current or voltage values in terms of their ratios, notwithstanding variations in the electromotive force which energizes the instrument.

Figure 1 is an elevation, partly in section, of the preferred form of my invention;

Figure 2 is a section on the line 2—2 of Figure 1;

Figure 3 is a section on the line 3—3 of Figure 1;

Figure 4 is a section on the line 4—4 of Figure 1;

Figure 5 is a diagrammatic view of the instrument connected in a circuit.

The moving system of the usual type of D'Arsonval indicating electrical instrument is caused to deflect under the influence of a torque exerted thereon by current flowing through a coil suspended between the pole faces of a permanent magnet. The deflection is limited and the moving system comes to rest at a point where the restoring torque is equal and opposite to the deflecting torque. This restoring torque is usually applied to the moving system through a spiral torsion spring, which spring exerts a mechanical bias in direct proportion to the deflection. In many places where an electrical instrument of the indicating type could be used, the power supply is not a constant voltage. Such application includes aircraft and automotive installation and many others where the source of power consists of a battery or generator. The voltage applied to the electrical circuit in such a system is subject to numerous influences tending to cause it to vary. For instance, both the battery and generator voltages are functions of the rate at which they are supplying power. The battery voltage is further affected by the amount it has been discharged. The generator voltage is also a function of its speed and would vary with the speed of its prime mover.

The above discussion as regards the introduction of errors by voltage fluctuation is also applicable to a moving vane type instrument in which the torque is exerted on the moving system by the interaction of a magnetic field set up in a coil by a current flowing through the same, and an iron vane rotatably suspended in the field of the coil. In this case, the vane may be either permanently magnetized or not. In either case the net effect of a voltage fluctuation is to cause the magnetic field to fluctuate and the reaction of the vane thereon to fluctuate. The fluctuating force exerted on the vane is opposed by a steady torsional force from the spiral spring and the moving system is, therefore, not at rest. Any measuring device, therefore, based on the voltage of a battery or generator balanced against the mechanical bias of a torsional spring will be in error by at least the same amount as the voltage.

Referring now to the drawing in detail, and in particular to Figures 1, 2, 3 and 4, the preferred form of my invention is shown to be a D'Arsonval or moving coil type of direct current electrical instrument in which 1 designates a substantially C shaped, laminated permanent magnet. Suspended between the opposed arcuate pole faces of the magnet 1 is the moving system of the instrument and the soft iron cores about which the moving coils rotate.

The laminations of permanent magnet 1 are securely clamped together between shoulders 4 and nuts 3 of screws 2, as shown in Figure 1. The screws 2 also extend above the shoulders 4 and terminate in studs, externally and internally threaded for the purpose of providing further support for other parts of the device. Secured between the shoulders 4 and nuts 5 are bridge 6 and formed plate 7. The bridge 6 is apertured at the center to adjustably receive a screw 8, the inner end of which is a jewelled bearing cup. The plate 7 is formed in such a manner that it engages the upper surface of the magnet, as at 9, and is securely held in this position by the tabs 10 which are clamped between shoulders 4 and nuts 5. By this means the depending portion 11 of the plate 7 is rigidly held in axial alignment with the cores and moving coils and is useful for supporting these parts.

The upper end of the upper core, designated 12, is supported by a narrow arm 13 extending inwardly from plate 7. The lower end of core 12 and the upper end of the lower core, designated by numeral 14, are supported by a U shaped strip 15, riveted as at 16, to the portion 11 of plate 7.

The lower support of core 14 is likewise one arm of U shaped strip 17 riveted to 11 at 18, the other arm extending across the bottom of the movement to receive the screw 19. The upper end of screw 19 terminates in a jewelled cup, which, in conjunction with the jewelled cup in screw 8, provides bearing points for the moving coil system. Rotatably supported between the jewel bearings, in axial alignment with the cores 12, 14, is the moving coil assembly comprising the two coils 20, 21 separately wound on rectangular aluminum bobbins and cemented together or otherwise joined along 22 to form an integral unit. The supporting means consist of pivot shafts affixed to the top and bottom of the coil assembly. The coils 20, 21 are so wound that the torques exerted by them on the moving system are in opposition, the torque due to current through coil 20 being the deflecting torque, and the torque due to 21 being the restoring torque, or vice versa. The aluminum bobbins on which the coils are wound serve to damp the movements of the coil assembly and thereby prevent a too rapid deflection of the unit.

The upper pivot shaft is a portion of an assembly comprising, in addition to the shaft, a pointer 23, counterweights 24, and a spiral filament 25. The pointer is arranged to sweep over a dial 26 which is mounted on the internally threaded ends of screws 2 by screws 27. The counterweights are adjustable radially relative to the axis of the movement and serve to balance the moving system under all operating or rest conditions. The spiral filament 25 is provided for the purpose of conducting current into the coils 20 and 21 from the external circuit and is so constructed as to exert a minimum of torsional effect on the moving system.

The current is conducted from the external circuit into the spiral filament through angle plate 28, which, for convenience in manufacture and assembly, is mounted about the screw 8. Plate 28 is held in position by a spring washer bearing between the plate and the lock nut 29 on screw 8.

The lower pivot shaft is a portion of an assembly comprising, in addition to the shaft, two spiral filaments 30 and 31 of the same low torsion character as filament 25. These filaments are provided for the purpose of conducting current from the coils 20, 21 to the external circuit. The filaments 30, 31 are connected at their inner ends to coils 21, 20, respectively, and at their outer ends to angle plates 32, 33, respectively, and thence to the external circuit.

The inner ends of the two filaments are mounted on the pivot shaft on insulating collars and the angle plates 32, 33 are insulated from each other and the shaft by a nonconducting sleeve and nonconducting washers. The sleeve (not shown) surrounds the screw 19 and the washers 34 are placed so as to separate lock nut 35, plates 32, 33 and plate 17. The nut 35 serves at once to retain plates 32, 33 and to lock screw 19 in proper adjustment.

Referring now to Figures 1 and 3, it will be noted that the pole faces surrounding core 12 and coil 20 are concentric with core 12. Coil 20 then moves in a uniform air gap and hence moves in a magnetic field of uniform strength. The deflecting torque due to a current flowing through coil 20 is therefore of unchanging value throughout the deflection of the instrument.

Referring next to Figures 1 and 4, it will be seen that the pole faces surrounding core 14 and coil 21 are eccentric to core 14. Coil 21 then moves in a nonuniform magnetic field. The restoring torque, due to a current flowing through coil 21 is therefore a function of the deflection of the instrument, being the greatest when the deflection carries the movement to the extreme clockwise position, viewing the movement as in Figure 4. The exact shape of the pole faces surrounding coil 21 and core 14 is not of consequence so long as the strength of the field through which coil 21 moves is continually changing in the same sense. That is to say, that the eccentricity of the pole faces with respect to the core 14 can be great or small as the utility of the instrument requires. The effect of decreasing the eccentricity is to increase the sensitivity of the instrument, since the coil 21 must swing through a greater angle before balancing out any given increment of deflecting torque exerted on coil 20. Obviously an increase in the eccentricity of the pole pieces would cause a corresponding decrease in the sensitivity of the meter. Further, the eccentricity of the pole faces need not be in the form of a regular spiral, but can be irregular, in order to give a linear scale, if the change in field strength is always in the same sense.

Referring now to Figure 5, the preferred form of my invention is shown connected in a circuit which is representative of an aircraft or automotive installation. In this figure, 40 is a storage battery of a type generally used in airplanes or automobiles. Battery 40 is connected through a current limiting resistor 41 into filament 25. Filament 25 is connected to coils 20, 21 by wires 42, 43, respectively. The opposite end of coil 20 is connected by wire 44 to the inner end of filament 31. The outer end of filament 31 is connected by wire 45 to the paralleled resistors 46, 47 and thence to the battery.

The other end of coil 21 is connected by a wire 48 to the inner end of filament 30. The outer end of filament 30 is connected by a wire 49 to resistor 50 and thence to the battery.

Resistor 41 is of relatively high value and is inserted in the circuit as a protective device to prevent excessive currents from flowing through the coils 20, 21.

Resistors 46 and 50 are calibrating resistors placed in the circuit to control the sensitivity and response of the instrument.

Resistor 47 is the quantity being measured and in this case is shown as a bulb resistor placed in an engine block or crankcase for the purpose of measuring the temperature thereof.

The moving system is shown in Figure 5 as being deflected to one-half scale and the coils 20, 21 occupy the same position in Figures 3, 4 and 5.

In operation the resistor 47 is placed in the crankcase or engine block of the motor and thereafter assumes the same temperature as the body in which it is placed.

Then the current flowing through coil 20 is a measure of the resistance of resistor 47. The resistance of 47 is, however, a function of its temperature, which temperature is also the temperature of the body in which 47 is inserted. Therefore, the current through coil 20 is a function of the temperature to be measured.

Say that the resistor 47 is used to measure the temperature of the oil in an aircraft engine and assume that the temperature is now at the desired point. The moving system of the instrument is then acted upon by a clockwise torque due to the current through coil 20 and a counterclockwise torque due to current through coil 21. The movement will then deflect clockwise until the constant deflecting torque of coil 20 is balanced by the increasing restoring torque of coil 21. If now, the temperature of the oil in the crankcase increases, the resistance of 47 will increase due to the rise in temperature the current through coil 20 will decrease and the deflecting force will correspondingly decrease. The movement is now acted upon by unbalanced torques and will rotate counterclockwise until the diminished deflecting force is balanced by the diminishing restoring force. The movement therefore assumes a new position of balance and a new reading is indicated on dial 26 by pointer 23. If the temperature of the oil decreases, an opposite effect will be obtained and the pointer will swing clockwise to a new position of balance.

If at any time during the operation of the instrument the voltage of the battery 40 should vary it will be seen that the currents through the coils 20, 21 will both vary in accordance with it. The net result of this will be to increase or decrease both torques by the same amount and cause no variation in the indication of the instrument.

The torsional effects of the spiral filaments 25, 30, 31 are negligible in the normal operation of the instrument, but, should the battery fail or an open circuit result from a broken wire, the torque due to the spiral filaments will cause the pointer to swing counterclockwise off scale and thereby notify the observer of the fault. Thus, this instrument will measure and indicate the true value of the temperature of a body being measured and will do so regardless of variation in the voltage of the power supply.

It is obvious that this instrument would also be useful as an ohmmeter to measure the value of unknown resistances, as for instance in a battery powered portable ohmmeter.

It will be understood that I desire to comprehend within my invention such modifications as come within the scope of the claims and the invention.

Having thus fully described my invention, what I claim as new and desire to secure by Letters Patent, is:

1. A meter for determining the ratio between two currents, said meter comprising a pair of coils adapted to rotate between the poles of a permanent magnet, said currents being supplied to the coils in opposition, the pole face portions of the magnet adjacent one of said coils being eccentric to said one coil by a continuous increase in the air gap between the coil and each pole face in the same direction of rotation of the coil, the pole face portions of the magnet adjacent the other of said coils being concentric to said coil.

2. A meter for determining the ratio between two currents, said meter comprising a pair of coils adapted to rotate between the poles of a permanent magnet, said currents being supplied to the coils in opposition, said coils being secured together and mounted between bearings, torsionless spiral filaments connected between said bearings and the coils for supplying currents to the coils, the pole face portions of the magnet adjacent one of said coils being eccentric to one said coil by a continuous increase in the air gap between the coil and each pole face in the same direction of rotation of the coil, the pole face portions of the magnet adjacent the other of said coils being concentric to said coil.

FREDERICK JOSEPH LINGEL.